Patented Mar. 5, 1946

2,396,206

UNITED STATES PATENT OFFICE 2,396,206

METHYLATION OF OLEFINIC HYDROCARBONS

Frederick F. Rust and William E. Vaughan, Berkeley, Calif., assignors to Shell Development Company, San Francisco, Calif., a corporation of Delaware No Drawing. Application April 26, 1944, Serial No. 532,892

14 Claims. (Cl. 260—676)

This invention relates to the methylation of unsaturated hydrocarbons, and more particularly to a process whereby methyl radicals are attached to terminally unsaturated hydrocarbons to produce saturated and/or unsaturated hydrocarbons containing a greater number of carbon atoms per molecule than the starting unsaturated hydrocarbon thus treated.

It has been discovered that di(tertiary alkyl) peroxides having the general formula

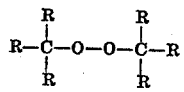

wherein each R represents a like or different saturated aliphatic radical, e. g. methyl, ethyl, propyl, etc. radical, may be formed by the controlled non-explosive oxidation of saturated aliphatic hydrocarbons containing a tertiary carbon atom, said oxidation being effected with oxygen, in the presence of hydrogen bromide, and at an elevated temperature which is however below the spontaneous combustion temperature of the mixture. For example, di(tertiary butyl) peroxide may be produced by conveying a vaporous mixture of isobutane, oxygen and hydrogen bromide (which substances may, for instance, be used in a volumetric ratio of 2:2:1) through a reactor at ordinary or superatmospheric pressure and at a temperature of about 160° C. Still another method of producing di(tertiary alkyl) peroxides includes the step of reacting a saturated tertiary alkyl hydroperoxide, i. e. a compound having the general formula

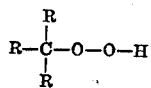

wherein each R represents a like or different saturated aliphatic radical, with a saturated tertiary alcohol, this reaction being effected at substantially atmospheric temperatures in the presence of an aqueous acid medium, e. g. aqueous sulfuric acid solution. As compared to the known organic peroxides, the di(tertiary alkyl) peroxides are surprisingly stable. For instance, di(tertiary butyl) peroxide does not explode even when ignited, but burns with a sooty flame. Also, it does not explode even when dropped onto a hot plate maintained, for example, at a temperature of about 250° C.

We have discovered that di(tertiary alkyl) peroxides, and particularly those in which at least one of the alkyl radicals attached to the tertiary carbon atom is a methyl radical, when subjected to elevated temperatures, will decompose, and that such decomposition is accompanied by the liberation of alkyl radicals, e. g. methyl radicals. For instance, di(tertiary butyl) peroxide begins to decompose at an appreciable rate at a temperature of 190° C., said decomposition being substantially complete at about 200° C. Manifestly, the decomposition temperature will depend on the particular di(tertiary alkyl) peroxide subjected to the elevated temperature. Without any intention of being limited by any theory of the case, it is now believed that this decomposition of the di(tertiary alkyl) peroxides takes place in accordance with a chain mechanism, which in the case of di(tertiary butyl) peroxide, may be represented by the following equations:

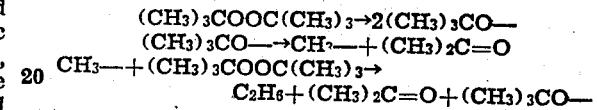

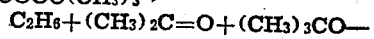

etc., wherein the dash (—) denotes a free radical. It is thus seen that the decomposition of di(tertiary butyl) peroxide results in the formation of acetone and of methyl radicals which produce ethane. In this connection, it must be noted that in accordance with the third step of the above outlined chain mechanism, an attack of a free methyl radical on the peroxide causes a scission of a carbon-to-carbon bond, which results in the liberation of a methyl radical and in the continuation of the chain mechanism via the second of the above steps.

We have also discovered that the presence of unsaturated hydrocarbons, particularly those containing an olefinic linkage in the alpha position, in the reaction zone in which a peroxide of the above defined class is being subjected to decomposition causes the addition of methyl radicals to such unsaturated hydrocarbons, thereby resulting in the formation of saturated and/or unsaturated hydrocarbons having a larger number of carbon atoms per molecule than the unsaturated hydrocarbon introduced into such reaction zone. It is believed that the unsaturated hydrocarbons, i. e. olefins, participate in the reaction chain mechanism, which latter in the case of reactions involving propylene and di(tertiary butyl) peroxide may be represented by the following equations:

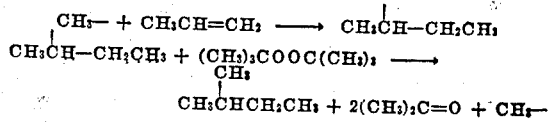

Also, instead of the second of the above presented reactions, the secondary butyl radical may also react with another olefin molecule to produce the correspondingly higher molecular weight hydrocarbons, etc. Paralleling the above outlined addition of two methyl radicals to the double bond, there is still another reaction which apparently occurs during the interaction of terminally unsaturated olefinic hydrocarbons with di(tertiary alkyl) peroxides, particularly di(tertiary butyl) peroxide, at the temperatures at which the decomposition of the latter occurs. This reaction may be defined by stating that the presence of significant amounts of methane in the effluent shows that a hydrogen atom is removed from a terminal carbon atom of the hydrocarbon. For example, the interaction of a methyl radical with propylene may form methane and an alkyl radical (which may in turn react with the peroxide to give straight chain butylenes). The interaction of a methyl radical with isopentene (3-methyl butene-1) may cause the formation of the radical

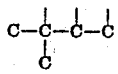

which may further react with the peroxide to add a methyl group and form a branched chain hexene. Also, the above isopentene may react to form

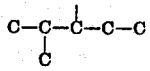

which may further react to produced branched chain hydrocarbons having a still higher molecular weight. There are thus several competing reactions which may be summarized as including the addition and substitution of methyl radicals and the polymerization of the olefinic hydrocarbons. Generally, it has been found that the use of relatively high mol ratios of the olefinic hydrocarbons to the peroxides in the reaction zone tends to favor methylation, which term includes both the mono-methylation and the di-methylation. The average molecular weight of the reaction product will increase with the exhaustion of the peroxide introduced into the reaction zone, and when methylation is desired it is therefore preferred to maintain a desired or optimum concentration of the peroxides in said reaction zone by continuous or intermittent introduction of additional amounts thereof.

The organic peroxides employed as one of the reactants to yield the methyl radicals comprise the di(tertiary alkyl) peroxides in which each of the carbon atoms directly linked to the peroxy oxygen atoms is a tertiary carbon atom, at least one of the alkyl radicals attached to each of said tertiary carbon atoms being a methyl radical. This class of peroxides may be represented by the formula

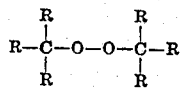

wherein each R represents a like or different saturated aliphatic radical, at least one of such radicals attached to each of the tertiary carbon atoms being the methyl radical. The following are illustrative examples of such di(tertiary alkyl) peroxides: di(tertiary butyl) peroxide, di(2-methyl butyl-2) peroxide, di(2-methyl pentyl-2) peroxide, di(3-methyl pentyl-3) peroxide, and their homologues, as well as peroxides of the above defined class in which one or more of the aliphatic radicals attached to the tertiary carbon atoms (which are directly attached to the peroxy oxygen atoms) are substituted by or contain aryl, aralkyl, alkaryl and/or alicyclic radicals, examples of such compounds being di(1-phenyl 1-methyl propyl-1) peroxide, di(1-phenyl 2-methyl propyl-2) peroxide, and di(1-cyclohexyl 1-methyl propyl-1) peroxide. Obviously, it is possible to use asymmetrical peroxides of the above class, e. g. tertiary butyl-tertiary amyl peroxide.

As to the unsaturated organic compounds, it is best to employ any unsaturated hydrocarbon containing an olefinic linkage in the alpha or terminal position. Representative examples of unsaturated organic compounds of this class include the terminally unsaturated straight chain olefins such as ethylene, propylene, butene-1, pentene-1, hexene-1, and their homologues, the branched chain terminally unsaturated olefins such as isobutylene, 2-methyl butene-1, 3-methyl butene-1, 3-methyl hexene-1, 3,3-dimethyl butene-1, and the like and their homologues. Also included in this class of unsaturated compounds are the unsaturated hydrocarbons of the defined class in which one or more of the above methyl radicals attached to the vinyl group are substituted by or contain an aryl, aralkyl, alkaryl and/or cycloalkyl radical or radicals, examples of such compounds being styrene, alkyl benzene, vinyl cyclopentane, and the like, and their homologues.

The methylation in accordance with the process of the present invention is preferably effected in the vapor phase and in a batch, intermittent or continuous manner. The reaction temperature must be such that the di(tertiary alkyl) peroxide of the class defined herein will decompose, the optimum operating temperature obviously depending on the particular peroxide employed as well as on the pressures, ratios of reactants, residence time, and the like. Generally speaking, the temperature will vary between about 150° C. and the temperature at which substantial degradation of the unsaturated organic compound occurs. A preferred range is between about 175° C. and about 275° C., optimum yields of the desired products of methylation having been obtained, particularly in the case of di(tertiary butyl) peroxide, when the reaction was effected at substantially atmospheric pressure and at temperatures of between about 200° C. and about 240° C. As to the pressure, the reaction may be effected under atmospheric or superatmospheric pressure, the latter being preferred in some cases because of the possibility of obtaining greater throughput per unit of time per unit of reaction space. The ratio of the olefinic hydrocarbon to the peroxide may also vary. As mentioned above, the use of relatively high olefin-to-peroxide ratios tends to yield greater amounts of products of methylation, particularly when the operating temperature is not excessively high. Mol ratios of olefins to peroxides of from 1:1 to about 15:1 may be employed, the preferred ratio being in the neighborhood of from about 5:1 to 10:1.

In a preferred embodiment of the invention, the reactants employed in suitable or optimum amounts are conveyed through a reaction tube maintained at the desired temperature, the rate of throughput being such that the reactants are in the reaction zone for a period of time sufficient to effect a substantial decomposition of the peroxide, said decomposition yielding the methyl radicals which react with the olefinic reactant. The effluent mixture may then be treated to recover the products of methylation and/or polymerization, and the unreacted reactants may then be recycled back into the feed to the reaction zone.

The following examples are illustrative of the process of effecting the addition of methyl radicals to the terminally unsaturated olefinic compounds:

Example I

An equivolumetric mixture of ethylene and di(tertiary butyl) peroxide was conveyed through a Pyrex glass tube at such a rate that approximately 200° cc. of vapor volume (calculated at room temperature) were introduced per minute. The reaction tube was maintained at a temperature of 225° C. The reaction time was slightly less than ½ minute. The effluent reaction product leaving the reaction zone was collected and analyzed. It was found that approximately 9.0% of the introduced ethylene reacted per pass, and that approximately 89.6% of the di(tertiary butyl) peroxide was decomposed. An analysis of the reaction products showed also that, as calculated on the mol % of the reacted peroxide, this peroxide was converted to acetone, ethane, butane and hexane in the following percentages:

| | Per cent |
|---|---|
| Acetone | 100 |
| Ethane | 82.3 |
| Butane | 6.8 |
| Hexane | 1.6 |

Example II

Three separate runs were conducted under the same conditions as those employed in Example I, with the exception that the ratios of the ethylene to the peroxide in the three runs were 2:1, 4:1 and 9:1, respectively. Upon analysis of the reaction products, the conversion and yields were found to be as follows:

| Ratio of ethylene to peroxide | 2:1 | 4:1 | 9:1 |
|---|---|---|---|
| Per cent ethylene reacted | 10.0 | 8.5 | 3.5 |
| Per cent peroxide reacted | 94.2 | 80.4 | 59.2 |
| Mol per cent reacted peroxide converted to acetone | 100 | 100 | 100 |
| Ethane | 68.2 | 62.1 | 40.7 |
| Butane | 14.2 | 15.1 | 29.8 |
| Hexane | 4.6 | 13.4 | 10.2 |

Example III

A mixture of ethylene and di(tertiary butyl) peroxide, employed in a ratio of 9:1, was conveyed at a rate of 200 cc. per minute of vapor volume, as calculated at room temperature, through the aforementioned Pyrex glass tube, which was however heated to 235° C. An analysis of the effluent showed that 7.2% of the ethylene reacted, with 63.5% of the peroxide reacting per pass. The mol per cent of the reacted peroxide converted to the various compounds was found to be as follows:

| | Per cent |
|---|---|
| Acetone | 87.2 |
| Ethane | 61.6 |
| Butane | 13.6 |
| Hexane | 16.0 |

Example IV

A vaporous mixture comprising propylene and di(tertiary butyl) peroxide was conveyed through a Pyrex reaction tube maintained at a temperature of 225° C. The propylene was conveyed at a rate of 140 cc. per minute, while the rate of throughput of the peroxide was equal to 70 cc. per minute of vapor, calculated at room temperature and atmospheric pressure. The effluent mixture upon analysis showed that isopentane was produced in a yield of 25.4% based on the amount of introduced peroxide, and that the butylenes were produced in a yield of about 7%. About ⅔ of the butylenes consisted of butene-1, the remainder being butene-2. Lesser amounts of normal and isobutane, isobutylene, other pentanes and amylenes, etc., were also found in the reaction product.

Example V

Isobutylene and di(tertiary butyl) peroxide vapors were conveyed through a reaction tube at such a rate that 140 cc. per minute of isobutylene and 70 cc. per minute of the peroxide were used. The reaction temperature was 235° C. The effluent product upon analysis showed that satisfactory yields of neohexane and tertiary amylenes, together with isopentane, were attained.

Example VI

Propylene and di(tertiary amyl) peroxide are mixed in a volumetric ratio of about 5:1, and the vaporous mixture thus formed is conveyed through a reaction zone maintained at a temperature of about 235° C. The effluent product from said reaction contains appreciable amounts of isopentane and butylenes, with minor amounts of the butanes and higher homologues.

We claim as our invention:

1. In a process of producing butane, the steps of mixing ethylene and di(tertiary butyl) peroxide in a volumetric ratio of between about 5:1 and about 10:1, subjecting the vaporous mixture thus formed to a temperature of about 225° C., thereby effecting the decomposition of the peroxide and the methylation of ethylene, and recovering butane from the reaction mixture thus formed.

2. In a process of methylating ethylene, the steps of forming a vaporous mixture containing ethylene and di(tertiary butyl) peroxide in a volumetric ratio of between about 5:1 and about 10:1, subjecting the vaporous mixture thus formed to a temperature of between about 200° C. and about 240° C. for a period of time sufficient to effect a substantial decomposition of the peroxide and the methylation of ethylene, and recovering said products of methylation from the reaction mixture.

3. In a process of methylating ethylene, the steps of forming a vaporous mixture comprising ethylene and di(tertiary butyl) peroxide in a volumetric ratio of between about 1:1 and about 15:1, subjecting the vaporous mixture thus formed to a temperature of between about 175° C. and about 275° C. for a period of time sufficient to effect the substantial decomposition of the peroxide and the methylation of the ethylene, and recovering the products of methylation from the reaction mixture.

4. In a process of methylating ethylene, the step of subjecting a vaporous mixture comprising a major amount of ethylene and a minor but appreciable amount of di(tertiary butyl) peroxide to a temperature of between about 175° C. and about 275° C. for a period of time sufficient to effect a substantial decomposition of the peroxide, thereby effecting the methylation of the ethylene.

5. In a process for the production of isopentane, the steps of mixing propylene with di(tertiary butyl) peroxide in a volumetric ratio of between about 1:1 and about 15:1, subjecting the vaporous mixture thus produced to a temperature of between about 200° C. and about 240° C., thereby effecting the decomposition of the peroxide and the methylation of propylene, and recovering isopentane from the reaction mixture thus formed.

6. In a process of methylating propylene, the steps of mixing propylene and di(tertiary butyl) peroxide in a volumetric ratio of between about 1:1 and about 15:1, subjecting the vaporous mixture thus formed to a temperature of between about 175° C. and about 275° C. for a period of time sufficient to effect the substantial decomposition of the peroxide, thereby effecting the methylation of the propylene, and recovering said products of methylation from the reaction mixture.

7. In a process of methylating propylene, the steps of forming a mixture comprising a major amount of propylene and a minor but appreciable amount of di(tertiary amyl) peroxide, subjecting the vaporous mixture thus formed to a temperature of between about 175° C. and about 275° C. for a period of time sufficient to effect the substantial decomposition of the peroxide, thereby effecting the methylation of the propylene, and recovering said products of methylation from the reaction mixture.

8. In a process of producing neohexane, the steps of mixing isobutylene with di(tertiary butyl) peroxide in the vapor state and in a volumetric ratio of between about 5:1 and about 10:1, subjecting said vaporous mixture to a temperature of between about 200° C. and about 240° C. for a period of time sufficient to effect the substantial decomposition of the peroxide, thereby effecting the methylation of isobutylene, and recovering neohexane from the reaction mixture.

9. In a process for the methylation of isobutylene, the steps of mixing isobutylene with di(tertiary butyl) peroxide in the vapor state and in a volumetric ratio of between about 1:1 and about 15:1, and subjecting the vaporous mixture thus formed to a temperature of between about 150° C. and about 275° C. for a period of time sufficient to effect the substantial decomposition of the peroxide, thereby effecting the methylation of the isobutylene.

10. In a process of methylating unsaturated hydrocarbons, the steps of mixing a terminally unsaturated mono-olefin with di(tertiary butyl) peroxide in the vapor phase and in a volumetric ratio of between about 1:1 and about 15:1, and subjecting the vaporous mixture thus formed to a temperature of between about 175° C. and about 275° C. for a period of time sufficient to effect the substantial decomposition of the peroxide, thereby effecting the methylation of the mono-olefin.

11. In a process of effecting the methylation of an unsaturated hydrocarbon, the steps of forming a vaporous mixture comprising a hydrocarbon containing a terminal olefinic linkage and di(tertiary butyl) peroxide in a volumetric ratio of between about 1:1 and about 10:1, and subjecting the vaporous mixture thus formed to a temperature of between about 175° C. and about 275° C. for a period of time sufficient to effect the substantial decomposition of the peroxide, thereby causing the methylation of the unsaturated hydrocarbon.

12. In a process of effecting methylation of unsaturated hydrocarbons, the steps of forming a vaporous mixture containing a hydrocarbon having an olefinic linkage in the alpha position and a peroxide having the general formula

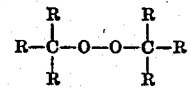

wherein each R represents a saturated aliphatic radical and wherein at least one of the R radicals attached to each of the tertiary carbon atoms is the methyl radical, said vaporous mixture containing said unsaturated hydrocarbon and said peroxide in a volumetric ratio of between about 5:1 and about 10:1, and subjecting said vaporous mixture to a temperature of between about 150° C. and about 275° C. for a period of time sufficient to effect a substantial decomposition of the peroxide, thereby causing the methylation of the unsaturated hydrocarbon.

13. In a process of methylating unsaturated hydrocarbons, the step of subjecting a vaporous mixture comprising a hydrocarbon containing a terminal olefinic linkage and a diperoxide having the general formula

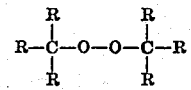

wherein each R represents a saturated aliphatic radical and wherein at least one of the R radicals attached to each of the tertiary carbon atoms is the methyl radical, said vaporous mixture containing said unsaturated hydrocarbon and said peroxide in a volumetric ratio of between about 1:1 and about 15:1, to a temperature of between about 200° C. and about 240° C. for a period of time sufficient to effect the substantial decomposition of the peroxide, thereby effecting methylation of the unsaturated hydrocarbon.

14. In a process of effecting methylation of unsaturated organic compounds, the step of subjecting a vaporous mixture comprising an organic compound containing a terminal olefinic linkage and a substantial amount of a di(tertiary alkyl) peroxide in which each of the carbon atoms directly linked to the peroxy oxygen atoms is a tertiary carbon atom, and wherein at least one of the alkyl radicals thus attached to each of said tertiary carbon atoms is the methyl radical, to a temperature of between about 150° C. and about 275° C. for a period of time sufficient to effect a substantial decomposition of the peroxide.

FREDERICK F. RUST.
WILLIAM E. VAUGHAN.